T. BROWN.
MANURE SPREADER.
APPLICATION FILED MAR. 1, 1909.

986,903.

Patented Mar. 14, 1911.

3 SHEETS—SHEET 2.

Witnesses
R. D. Tolman.
Penelope Cumberbach.

Inventor
Theophilus Brown.
By Rufus B. Fowler
Attorney

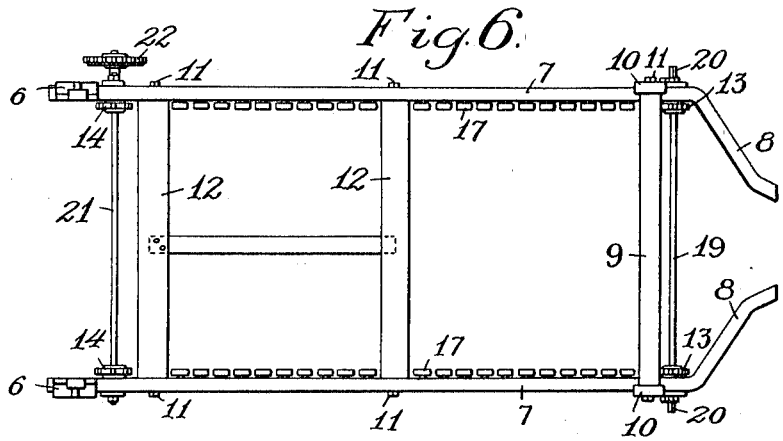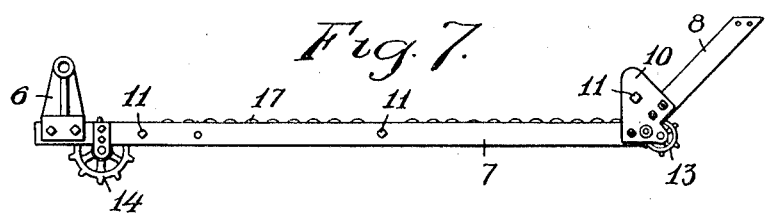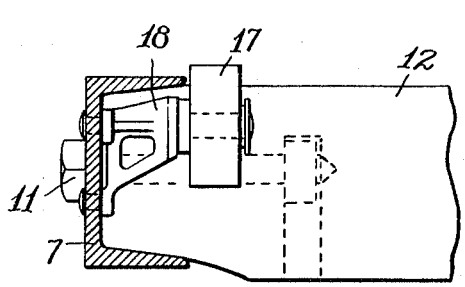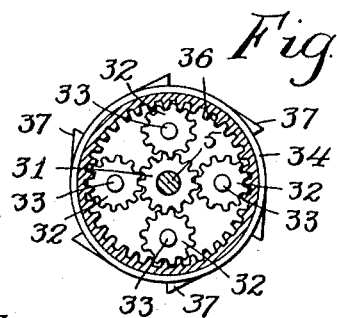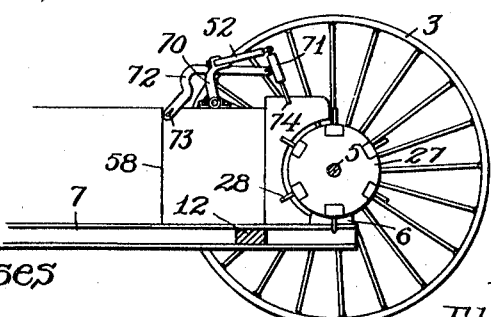

UNITED STATES PATENT OFFICE.

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

986,903.      Specification of Letters Patent.    Patented Mar. 14, 1911.

Application filed March 1, 1909. Serial No. 480,812.

REISSUED

*To all whom it may concern:*

Be it known that I, THEOPHILUS BROWN, a citizen of the United States, residing at Worcester, in the county of Worcester and Commonwealth of Massachusetts, have invented a certain new and useful Improvement in Manure-Spreaders, of which the following is a specification, accompanied by drawings forming a part of the same, in which—

Figure 1:
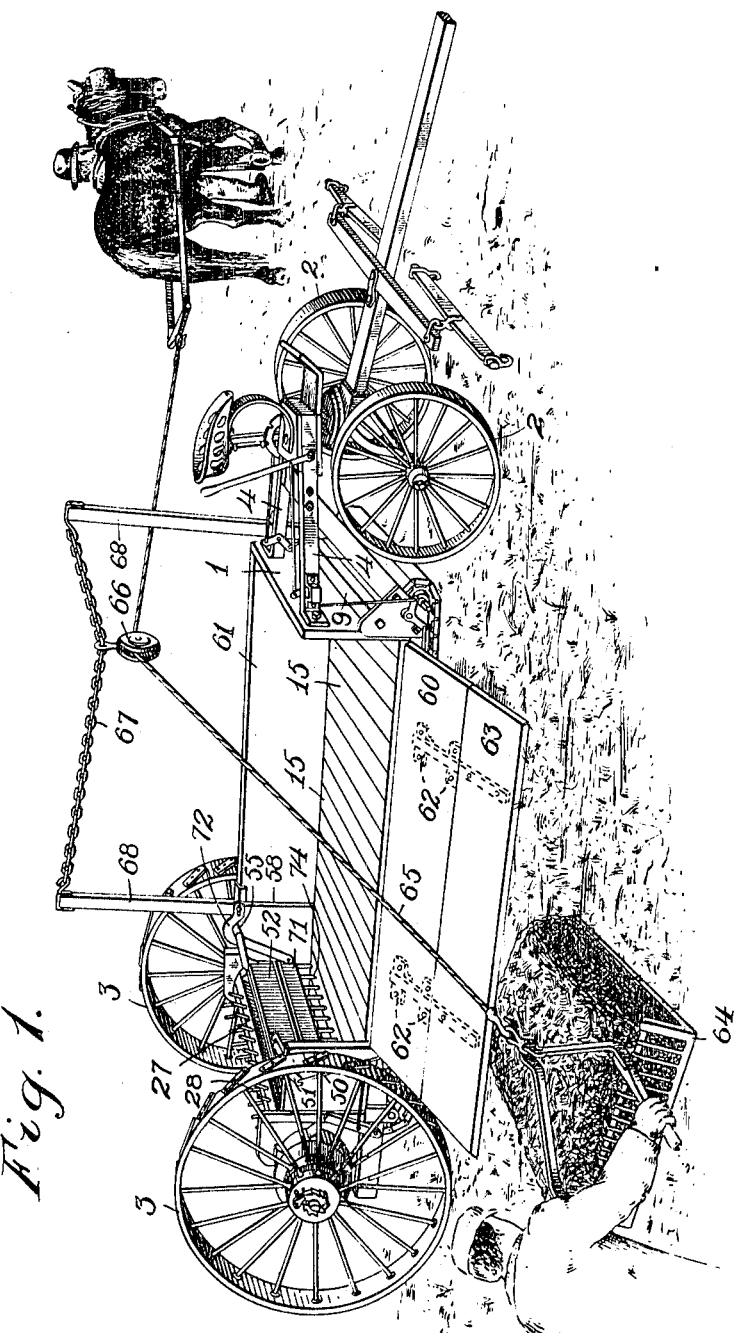
Figure 2:
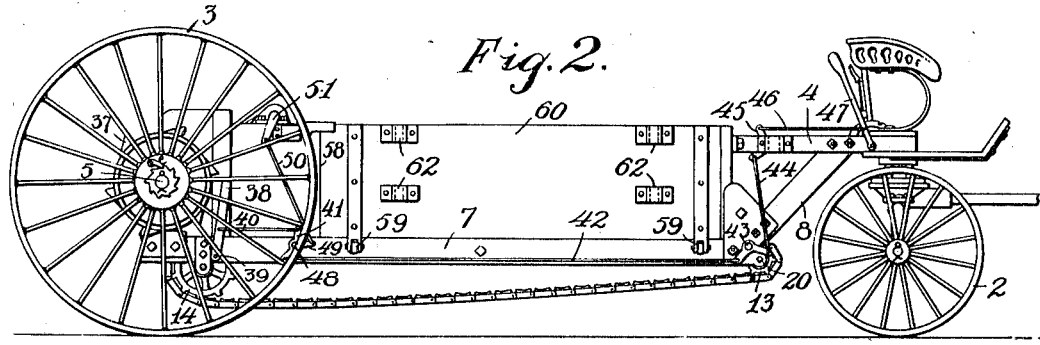
Figure 3:
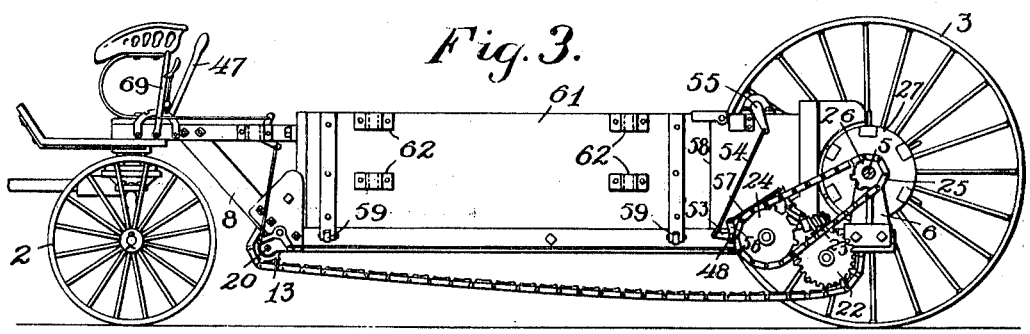
Figure 4:
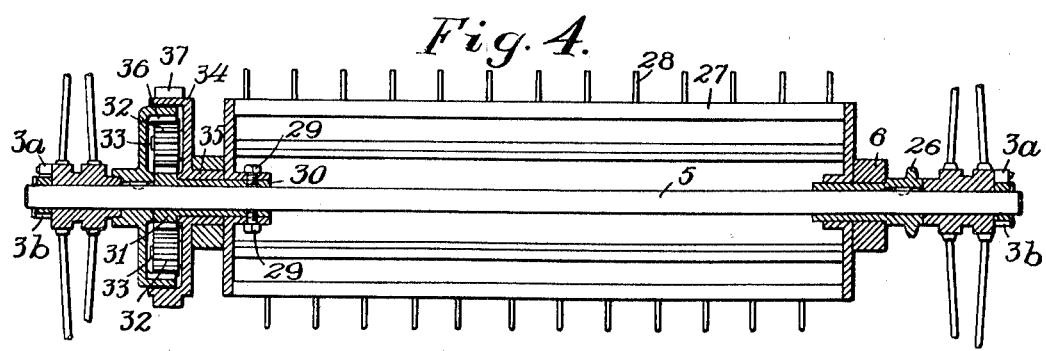
Figure 5:

Figure 1 represents a perspective view of a manure spreader embodying my invention. Figs. 2 and 3 are side elevations showing opposite sides of the spreader. Fig. 4 is a central sectional view taken through the beater and its driving mechanism. Fig. 5 is a detached view of the movable bottom and its supporting sprocket wheels. Fig. 6 is a plan view of the framework on which the body is supported. Fig. 7 is a side view of the same. Fig. 8 is a detached sectional view of one of the steel sills showing the attachment thereto of the rollers for supporting the bottom. Fig. 9 is a detached sectional view of the tailboard in a raised position, and Fig. 10 is a sectional end view of the beater driving mechanism.

Similar reference figures refer to similar parts in the different views.

The objects of my present invention are to facilitate the loading of the body of a manure spreader, to provide means for delivering the load in a plane nearer the ground, to simplify and strengthen the construction of the spreader, and to provide an improved driving mechanism for the beater. I accomplish these objects among others, by the construction and arrangement of parts as hereinafter described, the novel features being pointed out in the annexed claims.

The manure spreader to which my invention relates, like those now in common use, comprises a body for holding the load of manure, a rotating toothed beater at the rear end of the body for distributing the load, a movable bottom for moving the load rearwardly toward the beater as the operation of spreading continues, and means capable of being controlled by the driver at the seat for operating the movable parts. My improved beater, however, differs in many essential particulars from those hitherto in use, as will appear from the following description of the accompanying drawings, in which 1 denotes the body of the spreader supported at the forward end upon wheels 2, 2, and at the rear end upon wheels 3, 3. The forward end of the body is provided with a reach 4 which extends from the top of the body forward over the axle of the wheels 2, 2, space being thus provided in turning corners for the wheels 2, 2, to pass under the reach 4, and also allowing the bottom of the body to be supported in a plane lower than the axle of the wheels 2, 2. The rear end of the body is suspended from the rear axle 5 by means of brackets, one of which is shown at 6, Fig. 3, thereby bringing the bottom of the body in a plane below the rear axle upon which the wheels 3, 3, are carried. By this means of supporting the forward and rear ends of the body its bottom is brought comparatively close to the ground, so that the manure in loading requires but a slight elevation. In order to securely support the body of the spreader at its forward end by the forward axle, and with its rear end suspended from the rear axle, I mount the body upon two steel sills 7, 7, consisting of channel bars running lengthwise the body beneath its sides, at the rear ends of which the brackets 6 are riveted. The forward ends of the sills 7 are bent upwardly and inwardly, as shown at 8, 8, Figs. 6 and 7, and are attached at their forward ends to the reach 4. The steel channel bars forming the sills of the body are united at their forward ends by a cross bar 9, bolted at its ends to brackets 10, 10, which are secured to the sills. The middle and rear ends of the sills are attached by joint bolts 11 to wooden spacing bars 12, 12. Bearings attached to the sills 7 are provided for the front and rear sprocket wheels 13 and 14 around which the movable bottom 15 passes.

The movable bottom is constructed in the usual manner by transverse strips attached at their ends to chain links 16 which engage the sprocket wheels 13 and 14, and, in their passage between the tops of the sprocket wheels, rest upon a series of supporting rolls 17, each of which is journaled upon a bracket 18 riveted to the inner sides of the sill 7. The sprocket wheels 13 are carried upon a shaft 19 having at its ends polygonal tips 20, 20, adapted to receive a wrench by which the shaft 19 may be turned by hand and the movable bottom moved backward or forward.

The sprocket wheels 14, 14 are attached to a shaft 21 which carries upon one end a worm gear 22 engaged by a worm 23, having a geared connection, not shown, with a sprocket wheel 24, which is driven by a chain 25 from a sprocket wheel 26 carried upon and attached to the rear axle 5. The driving mechanism for the bottom, which comprises the worm gear 22 and worm 23 is of the usual form of construction now used in manure spreaders, and is substantially like that shown in United States Patent No. 268,410, dated December 5, 1882, and forms no part of my present invention.

The beater, which consists of the revolving cylinder 27 provided with radial teeth 28, is mounted concentrically upon the rear axle 5 and is attached by screws 29 to a sleeve 30, which is capable of turning loosely upon the rear axle 5, and carries upon its opposite end a pinion 31 which engages pinions 32 turning loosely upon studs 33, which are held in a rotatable plate 34, having a hub 35 which is journaled in one of the brackets 6 concentrically with the sleeve 30. The pinions 32 engage an internal gear 36 which is attached by a spline to the rear axle 5. Turning loosely upon the ends of the rear axle 5 are the supporting wheels 3, 3, each carrying a pawl 3ª which engages a ratchet wheel 3ᵇ attached to the ends of the rear axle 5, so that during the forward movement of the manure spreader the rotation of the supporting wheels 3 is imparted to the rear axle 5, and the rotation of the rear axle 5 rotates the sprocket wheel 26 and the internal gear 36. The plate 34, as the internal gear 36 rotates, is free to rotate with the internal gear, so that a rotary motion of the internal gear 36 is not imparted to the beater through the pinion 31. The plate 34 is, however, provided with a series of external teeth 37 by which the rotation of the plate 34 may be checked by means of a swinging pawl 38 pivoted at 39 to one of the body sills, and connected by a link 40 with one arm of a rocking three armed lever 41 on a rocking shaft 48, which is connected by a link 42, bell crank 43, link 44, bell crank 45, and link 46 to a hand lever 47 near the driver's seat, which enables the operator at will to swing the upper end of the pawl 38 into the path of the revolving teeth 37, thereby checking the rotation of the plate 34 and holding the pinions 32 stationary, so that rotary motion will be imparted to the pinion 31 by the rotation of the internal gear 36 and thereby revolving the beater.

The third arm 49 of the three armed lever 41 is connected by a link 50 with a bell crank 51 journaled upon the top of one of the sides of the body, and connected with one end of a tailboard 52, Fig. 1, by which the load of manure is held from working back and impeding the starting of the beater as the spreader is driven to the field. Upon the opposite end of the rocking shaft 48 is attached a two armed lever, as shown in Fig. 3, one of the arms 53 being connected by a link 54 with a bell crank 55, similar to the bell crank 51, journaled upon the upper edge of one of the sides of the body and connected with the opposite end of the tailboard 52. The other arm 56 of the two armed lever carried upon the rocking shaft 48 is connected by a link 57 with operative mechanism for throwing the worm 23 into and out of engagement with the worm gear 22, in a similar manner to that described in United States Patent No. 268,410, dated December 5, 1882.

The rocking of the shaft 48 in one direction, by means of a lever handle 47 serves to raise the tailboard, to connect the movable bottom with the driving power by means of the worm 23, and to put the beater in operation by swinging the pawl 38 into the path of the teeth 37, and the reverse movement of the lever handle 47 will lower the tailboard, disconnect the movable bottom and check the operation of the beater.

As the axis about which the wheels 3, 3, revolve is placed at the extreme rear end of the body coincident with the axis of the beater, the wheels 3 are caused to cover but a small portion of the sides of the body, leaving the entire sides between the extreme forward end of the body and the line 58 exposed, and thereby removing from the greater portion of the body the impediment to loading presented by the large supporting wheels 3, 3.

The rocking shaft 48 is journaled in the framework of the body to the rear of the line 58, and the link connections between the rocking shaft 48 and the lever handle 47 which traverse the length of the body, are located in a plane below the sides of the body, thereby enabling all that portion of the sides in front of the line 58 to be either attached to stakes held in stake irons or, as in the present instance, to be hinged to the sills at 59, so that the sides 60, 61, may be removed from their upright position to obviate the necessity of loading the body over the top of the sides. In the present instance I provide the sides 60, 61, with stake irons 62 to receive stakes attached to an extension, shown at 63, Fig. 1, where one of these extensions is shown applied to the side 60 in order to increase the width of the side and enable its outer edge to rest upon the ground and form an incline over which manure may be drawn by a scraper 64, by means of a cable 65, passing through a pulley block 66 supported in any convenient elevated position in order to enable horse power to be applied to the loading of the body. As represented in Fig. 1, the pulley block 66 is suspended from a chain 67 stretched across the upright stakes 68, 68, supported at their lower ends by the framework of the body.

In the operation of loading, the manure may be deposited upon the movable bottom through the open side of the body and opposite the sides 60, 61. The load may then be moved back against the tailboard 52 by applying a crank to the polygonal tips 20 of the sprocket shaft 19, and the loading continued at the vacant space at the forward end of the body.

Means for changing the speed of the movable bottom during the operation of spreading is provided substantially like that shown in United States Patent No. 268,410 of December 5, 1882, said means being operated by the attendant by a lever handle 69 and intermediate connections which however, form no part of my present invention.

The tailboard 52 is attached to the horizontal arms 70 of the bell cranks 51 and 55, and is raised and lowered by swinging the bell cranks as already described, by means of the intermediate connections between the bell cranks and the lever handle 47 located near the driver's seat.

The construction and operation of the tailboard is substantially like that of the tailboard described in United States patent issued to me May 29, 1906, No. 821,779, said patented tailboard comprising a hinged section corresponding to the transverse bar 71 in the present tailboard, which is hinged to the tailboard 52 and pivotally connected by bent arms 72 with the sides of the body at 73. Depending from the bar 71 are a series of teeth 74 which, when the tailboard is raised into the position shown in Fig. 9, are caused to stand at an oblique angle and contiguous to the revolving teeth of the beater, for the purpose of pulverizing any large lumps of manure that may be thrown by the beater against the teeth 74. When the tailboard is in its lowest position, as shown in Fig. 1, the teeth 74 are supported by the bar 71 so as to clear the movable bottom 15, and the teeth 74 are then brought into substantially the plane of the tailboard 52. As the tailboard is raised, however, by the rocking of the bell cranks 51 and 55 into the position shown in Fig. 9, the hinged bar 71, and teeth 74 are swung upon the tailboard 52 by means of their pivotal connection with the body of the spreader through the bent arms 72 in order to bring the teeth 74 at the proper angle, and in proper relation to the beater to serve as a pulverizer.

By my improved construction I lower the center of gravity of the load, render the body easy to be loaded by hand, enable power to be employed in loading as represented in Fig. 1, and provide means for depositing the load upon any portion of the movable bottom most convenient, and moving the same backward against the beater. I also provide means for driving the beater without the use of a sprocket chain and am enabled to entirely inclose the beater driving mechanism. The distribution of manure is accomplished upon a lower plane than in the ordinary type of manure spreaders now in use, and I so construct the tailboard as to enable it to do double duty of protecting the beater and also pulverizing the manure when the latter is in operation.

I claim,

1. The combination of a body and a movable bottom, an axle journaled at the rear of the body and above the plane of the bottom, supporting wheels carried by said axle, with the sides of the body in front of the periphery of said wheels removable, and means for moving said bottom to carry the load rearwardly during the process of loading.

2. The combination of a body and a movable bottom, a rotatable axle journaled at the rear of the body and above the plane of the bottom, supporting wheels for said axle, a beater rotatable concentrically with said axle, and intermediate driving mechanism between said beater and said axle.

3. The combination with a body and a movable bottom, of a rotatable axle journaled at the rear of the body and above the plane of the bottom, a beater rotatable concentrically with said axle, supporting wheels for said axle, and intermediate driving mechanism between said supporting wheels and said beater.

4. The combination with a body having a bottom, of supporting wheels for said body, a beater rotatable about an axis above the plane of the bottom and coincident with the axes of said supporting wheels, and intermediate driving mechanism between said beater and said supporting wheels.

5. The combination with a body having a bottom, of a pair of supporting wheels having their axes in a plane above said bottom, a rotatable axle journaled in a plane above said bottom, a beater journaled concentrically with said axle and independently rotatable, and means for operatively connecting said axle and said beater at will.

6. The combination with a body having a bottom, of a rotatable axle journaled above said bottom, a rotatable beater concentric with and independently rotatable about said axle, supporting wheels for said body rotatable about axes coincident with the axis of said axle, and intermediate driving mechanism between said beater and said supporting wheels.

7. The combination with a body having a bottom, of a rotatable axle journaled at the rear of the body and above the plane of the bottom, supporting wheels, means for rotating said axle from said supporting wheels, a beater journaled concentrically with said axle and independently rotatable, and means for operatively connecting said axle and beater.

8. The combination with an axle and supporting wheels therefor, connecting mechanism by which the axle is driven in one direction by said wheels, a sleeve rotatable on said axle, a pinion carried by said sleeve, a beater concentric with said axle and attached to said sleeve, an internal gear carried by said axle, a plate rotatable on said axle, intermediate gears carried by said plate and engaging said pinion and said internal gear, and means for checking the rotation of said plate at will.

9. The combination with a pair of rear wheels and a single axle connecting said wheels, a body having its bottom suspended below said axle, a beater journaled concentrically with said axle and above the plane of said bottom, means for rotating said axle, and means for connecting said beater with said axle at will.

10. The combination of a rotatable rear axle, depending brackets journaled on said axle, wheels supporting the ends of said axle, connecting rotating mechanism between said wheels and said axle, a beater concentric with said axle and operatively connected therewith, and a body with the rear end suspended from said brackets below the plane of said beater.

11. The combination with a rotatable rear axle, supporting wheels for said axle, a body suspended from said axle, a rotatable beater concentric with said axle, means for rotating said axle in one direction by said supporting wheels, and means for rotating said beater by said axle in an opposite direction.

Dated this twenty-sixth day of February 1909.

THEOPHILUS BROWN.

Witnesses:
PENELOPE COMBERBACH,
RUFUS B. FOWLER.